US010523075B2

(12) United States Patent
Murphy et al.

(10) Patent No.: US 10,523,075 B2
(45) Date of Patent: Dec. 31, 2019

(54) AUTOMATIC STATOR WIRE LEAD ROUTING

(71) Applicant: Tesla, Inc., Palo Alto, CA (US)

(72) Inventors: James Paul Murphy, San Jose, CA (US); Mark Finkle, Tracy, CA (US); Christopher James Whelan, San Jose, CA (US); Patrick David Hunter, San Mateo, CA (US); Nicholas Andrew Parrotta, Fremont, CA (US); Tal Fix, Palo Alto, CA (US)

(73) Assignee: Tesla, Inc., Palo Alto, CA (US)

( * ) Notice: Subject to any disclaimer, the term of this patent is extended or adjusted under 35 U.S.C. 154(b) by 223 days.

(21) Appl. No.: 15/814,534

(22) Filed: Nov. 16, 2017

(65) Prior Publication Data

US 2018/0138771 A1 May 17, 2018

Related U.S. Application Data

(60) Provisional application No. 62/423,107, filed on Nov. 16, 2016.

(51) Int. Cl.
H01F 7/06 (2006.01)
H02K 3/32 (2006.01)
H02K 3/52 (2006.01)
H02K 15/00 (2006.01)

(52) U.S. Cl.
CPC ............ H02K 3/325 (2013.01); H02K 3/521 (2013.01); H02K 15/0025 (2013.01); H02K 2203/06 (2013.01)

(58) Field of Classification Search
CPC ..... H02K 3/325; H02K 3/521; H02K 15/0025
See application file for complete search history.

(56) References Cited

U.S. PATENT DOCUMENTS

| 4,578,609 | A | * | 3/1986 | McCarty | H02K 21/028 310/156.24 |
| 5,090,108 | A | * | 2/1992 | Banner | H02K 15/0056 29/566.1 |
| 8,850,862 | B2 | * | 10/2014 | Akimoto | H02K 3/28 140/92.2 |
| 2007/0254522 | A1 | * | 11/2007 | Libby | H01R 13/5804 439/456 |
| 2010/0038982 | A1 | * | 2/2010 | Guercioni | H02K 15/0062 310/71 |

* cited by examiner

Primary Examiner — Paul D Kim
(74) Attorney, Agent, or Firm — Knobbe, Martens, Olson & Bear, LLP

(57) ABSTRACT

An apparatus for automatically routing a wire lead of a stator from a first position to a second position includes a base assembly to receive the stator. A clamp assembly is mounted on the base assembly to hold the wire lead in the first position. An arbor rotates the wire lead. The arbor has a holder to hold the wire lead. An end effector grips and moves the wire lead. A controller moves the end effector to grip the wire lead at the first position and to couple the wire lead with the arbor. Further, the controller rotates the arbor to rotate the wire lead along the circumference of the stator by a pre-determined angle. The controller moves the end effector to grip the wire lead held by the holder, and to move the wire lead to the second position.

16 Claims, 8 Drawing Sheets

AUTOMATIC STATOR WIRE LEAD ROUTING

CROSS-REFERENCE TO RELATED APPLICATIONS

The present U.S. Utility Patent Application claims priority pursuant to 35 U.S.C. § 119(e) to U.S. Provisional Application No. 62/423,107, entitled "AUTOMATIC STATOR WIRE LEAD ROUTING", filed Nov. 16, 2016, which is hereby incorporated herein by reference in its entirety for all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

TECHNICAL FIELD

The present disclosure relates to electric motors; and more particularly, relates to automatically routing wire lead of a stator from one position to another position.

BACKGROUND

Interest in designing and building fuel efficient, low emission vehicles has increased dramatically over the last decade, with significant emphasis being placed on the development of hybrid and all-electric vehicles. This has led, in turn, to a greater emphasis being placed on electric motors, either as a sole source of propulsion (e.g., all-electric vehicles) or as a secondary source of propulsion in a combined propulsion system (e.g., hybrid or dual electric motor vehicles). The electric motor in such applications may utilize an AC or DC permanent magnet motor design, an AC induction motor design, or other motor design known to work in hybrid and electric vehicles.

In an exemplary AC induction motor, a plurality of coil windings is used to create a magnetic field. Each of these coil windings comprises leads that must be routed to other parts of the motor and connected. This routing of the leads can be a time-consuming process and requires the leads to be placed manually. This manual manipulation of the coil windings may take considerable time and effort and introduce errors in the overall process. This may render a large-scale manufacturing process inefficient. Hence, there is a need for improved method and system for routing of lead and exit ends of the coil windings.

Figure 1:
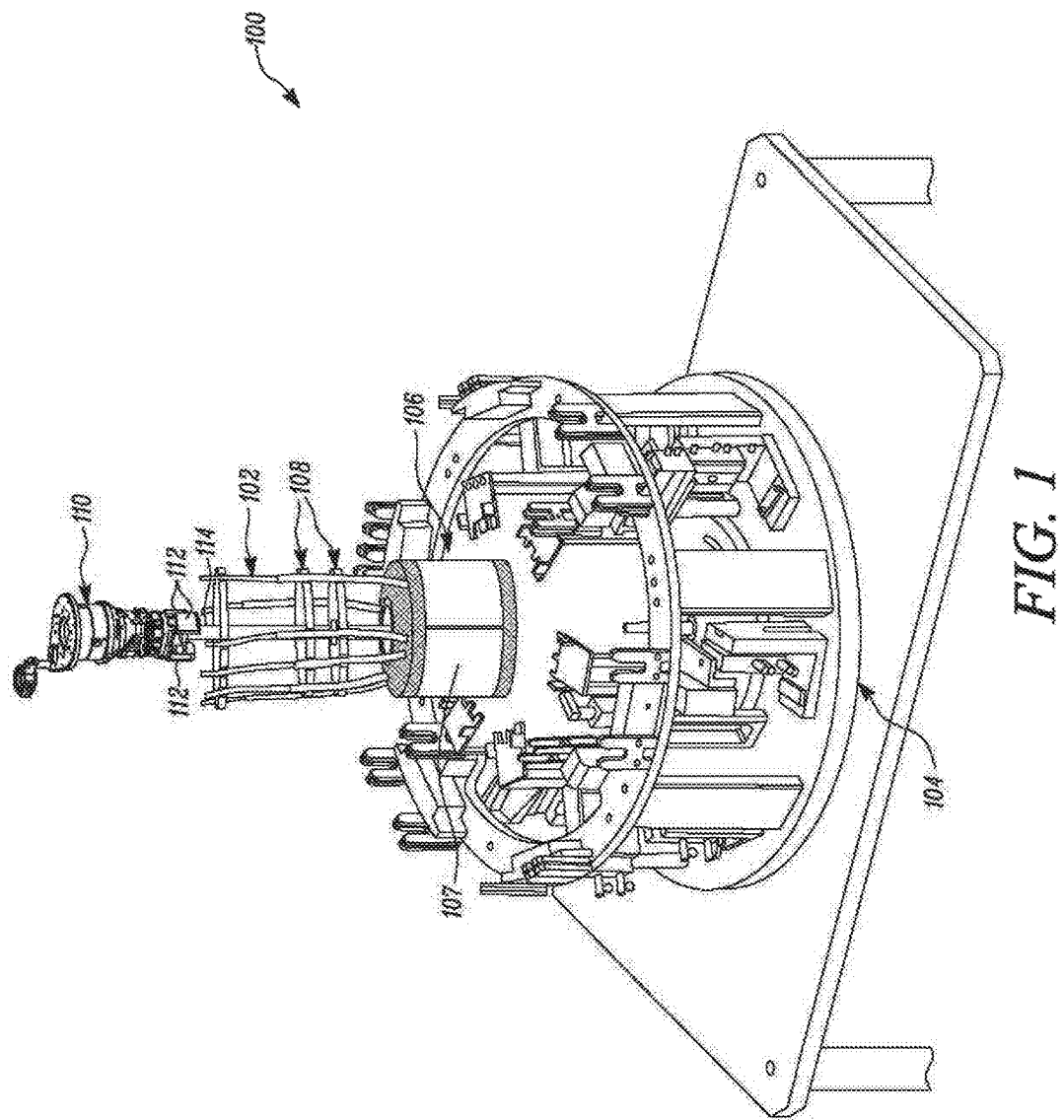
FIG. 1 illustrates a stator having wire leads wound around the stator being placed on an apparatus to rout the wire leads in a desired pattern, according to certain embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure relates to routing of wire leads of a stator. More particularly, the present disclosure relates to an apparatus and a method for automatically routing the wire leads of the stator associated with an electric motor.

The apparatus according to the present disclosure introduces an improved way of routing the wire lead of the stator. In embodiments of this disclosure, the apparatus includes a base assembly adapted to receive the stator. The wire lead may be already wound on the stator manually or by using a winding machine. Further, loose ends of the wire lead i.e. lead ends and exit ends may be temporarily held by a clipping or holding mechanism such as a disc, etc. The apparatus includes one or more clamp assemblies mounted on the base assembly in a vertically spaced apart manner. The clamp assembly temporarily holds the wire lead in a first position depending on the design, location and orientation of the clamp assembly. The apparatus includes an arbor to rotate the wire lead along a circumference of the stator. The arbor is provided with a holder to hold the wire lead through the holder.

The apparatus includes an end effector to grip and move the wire lead. Specifically, the end effector grips and moves the wire lead multiple times during the operation of the apparatus. The end effector and the arbor are in communication with a controller. The controller controls the rotation of the arbor such that a desired rotation of the wire lead is achieved. The controller controls movement of the end effector such that the end effector couples the wire lead to the arbor and decouples the wire lead from the arbor once the desired rotation of the wire lead is achieved. The apparatus, thus, provides automatic routing of wire lead of the stator. Although the present disclosure has been described with respect to routing of one wire lead, a person skilled in the art will appreciate that multiple wire leads can be used and the apparatus can automatically route all the wire leads in a desired manner.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates a perspective view of an apparatus 100 for automatically routing a wire lead 102 according to certain embodiments of the present disclosure. The apparatus 100 includes a base assembly 104 which may mount various components which are required during operation of the apparatus 100. The base assembly 104 may be a flat plate like structure providing a horizontal platform to mount the various components of the apparatus 100. According to certain embodiments of the present disclosure, the base assembly 104 is a flat plate having a circular geometry. The base assembly 104 may be of any other shape as well as per the need of the present disclosure. According to certain embodiments of the present disclosure, the base assembly 104 may further include a stator base plate (not shown) to receive a stator 106. The stator base plate may rotate relative to the base assembly 104. The stator 106 may include a stator core 107 made of a ferromagnetic material, such as assembled steel laminate plates.

The stator core 107 may have a cylindrical geometry having stator windings wound around the stator core 107. The stator windings are wound around the stator core 107 in a pre-determined winding pattern governed by the application for which the stator 106 is to be used. The stator windings include multiple wire leads 102 intertwined together to define a desired winding pattern as per the need of the application for which the stator 106 is to be used. The apparatus 100 provides means to post-process the wire lead 102 so as to provide desired relative positions of the wire lead 102 as well as a desired final structure to the wire lead 102 of the stator windings.

The wire lead 102 may be already wound on the stator 106 manually or by using a winding machine. Long, insulated copper wire material having a rectangular or circular cross section, for example, may be used for the wire lead 102. The wire lead 102 may either be of a fixed size or may be connected to a spool (not shown) of the wire lead 102 to supply the wire lead 102 as per requirements. According to certain embodiments of the present disclosure, the wire lead 102 is of a fixed length. However, it may be noted that other design, size and type of the wire lead 102 may be implemented by persons skilled in the art to realize the features of the present disclosure. Further, loose ends of the wire lead 102 i.e. lead ends and exit ends may be temporarily held by multiple discs 108 provided with slots to hold the wire lead 102 as shown in FIG. 1.

The stator 106, as shown in FIG. 1, is typically fabricated as a separate assembly prior to mounting on the base assembly 104. As shown, a transfer unit 110 is employed to transfer the stator 106 with the stator windings wound on the stator 106 onto the base assembly 104. According to certain embodiments of the present disclosure, the transfer unit 110 is a robotic end effector which may be programmed to transfer the stator 106 onto the base assembly 104. The transfer unit 110 includes multiple coupling members 112 to couple a shaft 114 coupling the multiple discs 108. The transfer unit may also interface with the stator core 107 and rotate to cause the stator core 107 to rotate.

According to specific embodiment of the present disclosure, the transfer unit 110 includes three coupling members 112. The transfer unit 110 may include various other linkages, components, control features to perform the task of transferring the stator 106 on the base assembly 104. It should be contemplated that the stator 106 may be transferred onto the base assembly 104 in any other manner as well as per the scope of the present disclosure. The present disclosure, in any way, is not limited to any means of transferring the stator 106 onto the base assembly 104.

Figure 2:
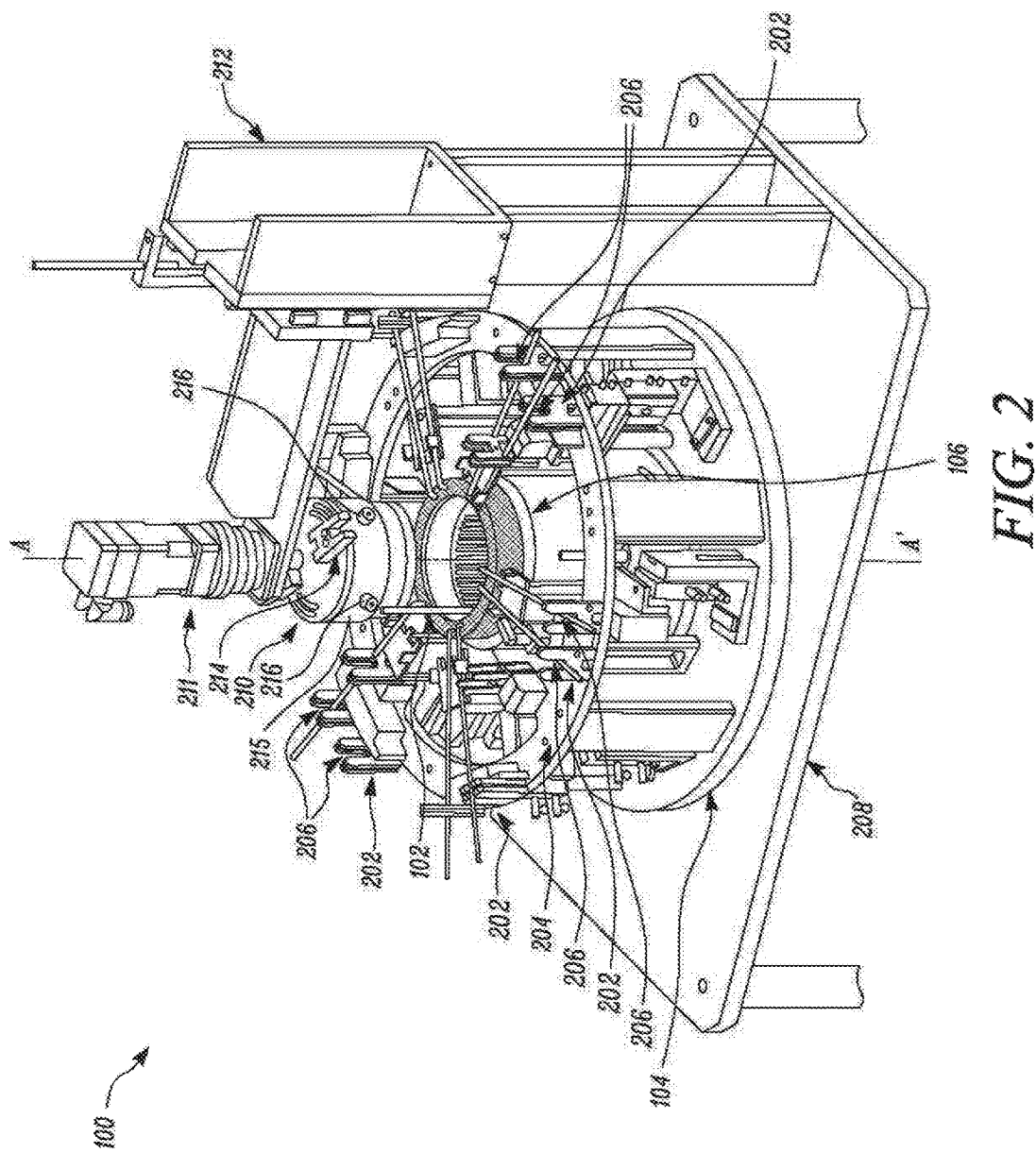
FIG. 2 illustrates a perspective view of the apparatus for routing the wire leads on the stator, according to certain embodiments of the present disclosure.

FIG. 2 illustrates another perspective view of the apparatus 100 for automatically routing the wire lead 102 on the stator 106 according to certain embodiments of the present disclosure. The apparatus 100 includes the base assembly 104 for mounting one or more components of the apparatus 100. The apparatus 100 includes a clamp assembly 202 mounted on the base assembly 104. The clamp assembly 202 may be mounted on the base assembly 104 by any conventional mounting means. According to certain embodiments of the present disclosure, the base assembly 104 includes a clamp ring 204 mounted on the base assembly 104. The clamp ring 204 may be a circular ring type structure extending along a periphery of the base assembly 104. The clamp ring 204 may mount multiple clamp assemblies 202 on the clamp ring 204 along the periphery of the base assembly 104 to support multiple wire leads 102 coming out of the stator 106 based on the application requirements.

The clamp assembly 202 may be any conventional type of clamp assembly which may hold the wire lead 102. The clamp assembly 202 includes multiple slots 206 to hold the wire leads 102. The wire leads 102 are arranged on the stator 106 such that the wire leads 102 extend radially outwards from the stator 106. The wire leads 102 extend out of the stator 106 in a set of two closely spaced wire leads 102. According to certain embodiments of the present disclosure, the clamp assembly 202 includes two slots 206 such that both the wire leads 102 from the set of two wire leads 102 passes through one of the slots 206 as illustrated. Position of the wire lead 102, when the wire lead 102 passes through the slots 206 in the clamp assembly 202 is defined as a first position. The first position of the wire lead 102 is a substantially horizontal position parallel to the base assembly 104. The clamp assembly 202 may hold a lead end or an exit end of the wire lead 102 in the first position. For example, as shown in FIG. 2, the wire lead 102 is shown in a horizontal position. The apparatus 100 may be mounted on a platform 208 as shown in the FIG. 2. The platform 208 may support multiple such base assemblies 104 on the platform 208 facilitating a large-scale production process. In one embodiment, the base assembly 104 may be configured to rotate relative to the platform 208 about an axis A-A' perpendicular to the platform 208. The axis A-A' passes through a center of the base assembly 104, and is perpendicular to the base assembly 104.

The apparatus 100 includes an arbor 210 adapted to rotate the wire lead 102 along a circumference of the stator 106. Structurally, the arbor 210 has a generally cylindrical geometry. The arbor 210 is mounted on an arbor shaft 211. An outer diameter of the arbor 210 is slightly smaller than an inner diameter of the stator 106. As shown, the arbor 210 may be connected to a support 212 mounted on the platform 208 through the arbor shaft 211. In certain embodiments, the apparatus 100 may include various support components to allow the movement of the arbor 210 in forward, backward, right, left, up, and down directions. The arbor 210 is configured to rotate the wire lead 102 by a predetermined angle in every rotation. The arbor 210 may also be configured to rotate the wire lead 102 by different predetermined angles in multiple rotations. According to certain embodiments of the present disclosure, the predetermined angle is 30 degrees. Further, the arbor 210 may rotate in a clockwise direction or an anti-clockwise direction depending on the application requirements. The base assembly 104 and the arbor 210 may rotate in unison, in different directions, or in same direction at different speeds. The rotational movements of the base assembly 104 and the arbor 210 may be separately controlled or may be controlled together.

The arbor 210 is required to hold the wire lead 102 while rotating the wire lead 102 along the circumference of the stator 106. For this, the arbor 210 is provided with a holder 214 to hold the wire lead 102 in a substantially vertical position. According to certain embodiments of the present disclosure, the holder 214 is able to hold multiple wire leads 102 together thus allowing simultaneous rotation of multiple wire leads 102. The arbor 210 further includes multiple fulcrum pins 216 coupled to the arbor 210. The fulcrum pins 216 may have a generally cylindrical geometry extending outwards from an outer surface 215 of the arbor 210 in a radially outward direction parallel to the base assembly 104. When the arbor 210 rotates about the axis A-A', the wire lead 102, being held by the holder 214 in a vertical position, bends against the fulcrum pin 216 such that the wire lead 102 rotates along the circumference of the stator 106. The fulcrum pins 216 may be coupled to the arbor 210 in any conventional manner such as a mechanical fastener, or adhesive means etc. as per the need of the present application.

Figure 3:
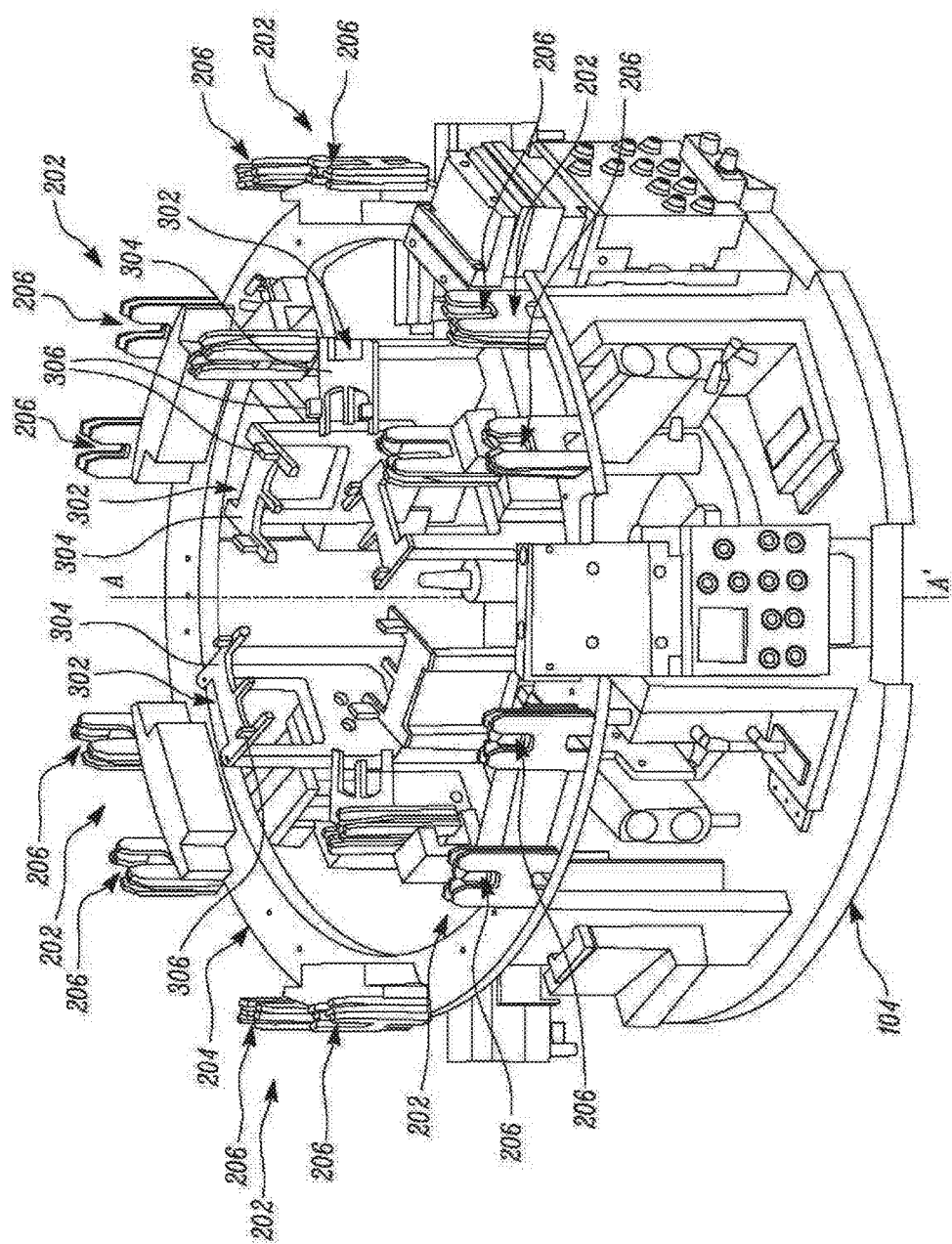
FIG. 3 illustrates a perspective view of the apparatus showing structural details of the apparatus without the stator, according to certain embodiments of the present disclosure.

FIG. 3 illustrates a perspective view of the base assembly 104 without the stator 106 and the arbor 210. It should be contemplated that the stator 106 and the arbor 210 are taken out only for illustrative purposes to show the various parts of the base assembly 104 in greater detail. The base assembly 104 includes a guide finger 302 to support the wire lead 102 coming out of the stator 106 between the stator 106 and the clamp assembly 202. The wire lead 102 may rest on a top surface 304 of the guide finger 302. The guide finger 302 may be mounted on the base assembly 104 by any conventional means known in the art such as a mechanical linkage etc. The guide finger 302 has a generally flat plate type structure which may support the wire lead 102 on the top surface 304 of the guide finger 302. The guide finger 302 may further include means at end of the top surface 304 of the guide finger 302 to prevent the wire lead 102 from slipping over the top surface 304 of the guide finger 302. According to certain embodiments of the present disclosure, the guide finger 302 includes bends 306 at ends of the top surface 304 to prevent slipping of the wire leads 102 from the guide finger 302. The guide finger 302 supports the wire lead 102 between the stator 106 and the clamp assembly 202. The guide finger 302 may be coupled to the clamp ring 204 as well in order to better locate a position of the guide finger 302 relative to the stator 106 and the clamp assembly 202 on the base assembly 104. The clamp assembly 202 and the guide finger 302 may be moved away and towards the axis A-A' in a radial direction on the base assembly 104. Further, the movement of the clamp assembly 202 and the guide finger 302 may be controlled through any conventional means such as a mechanical linkage, or hydraulic adjustment means.

Figure 4:
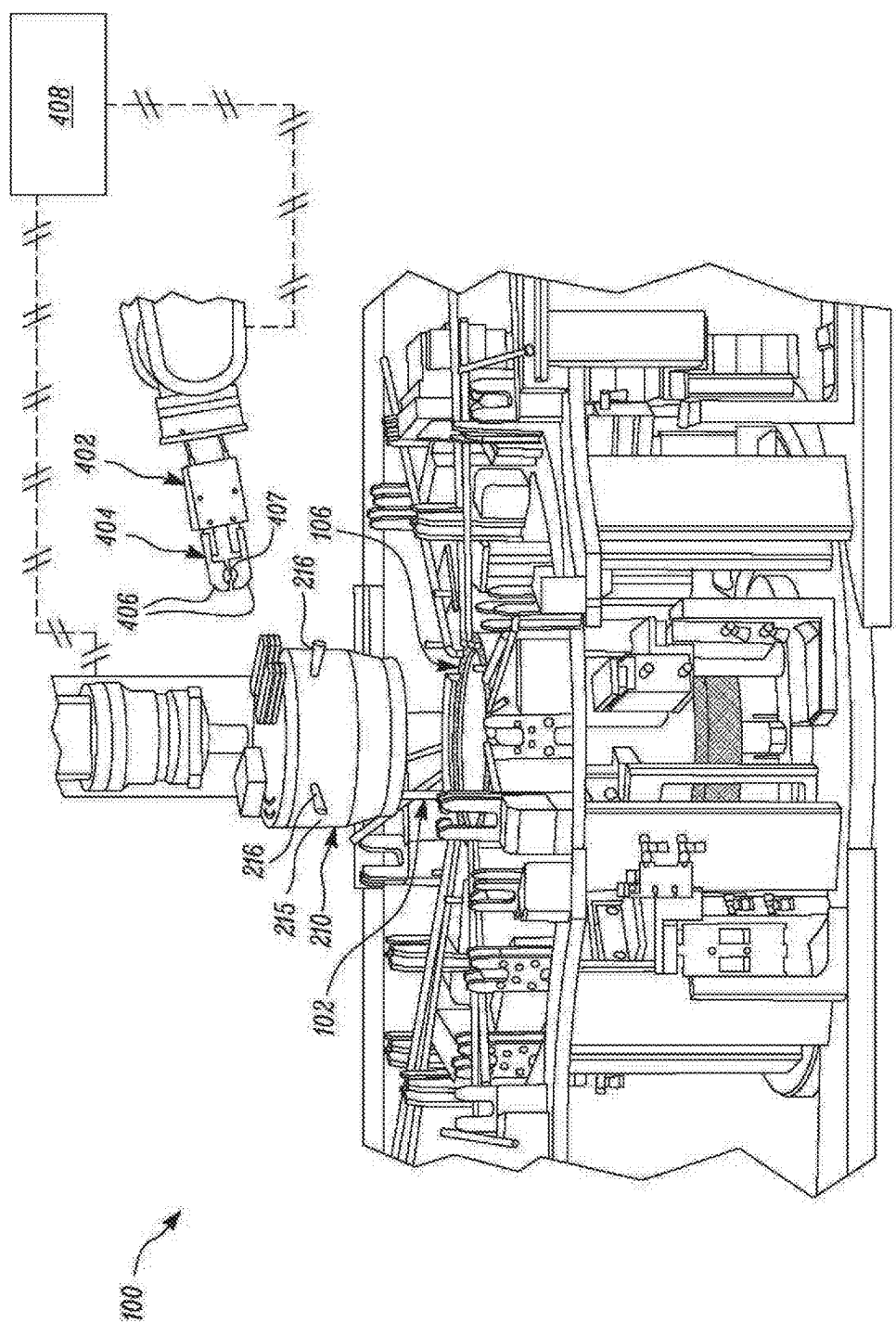
FIG. 4 illustrates a side perspective view of the apparatus showing an arbor and an end effector being controlled by a controller, according to certain embodiments of the present disclosure.
Figure 5:
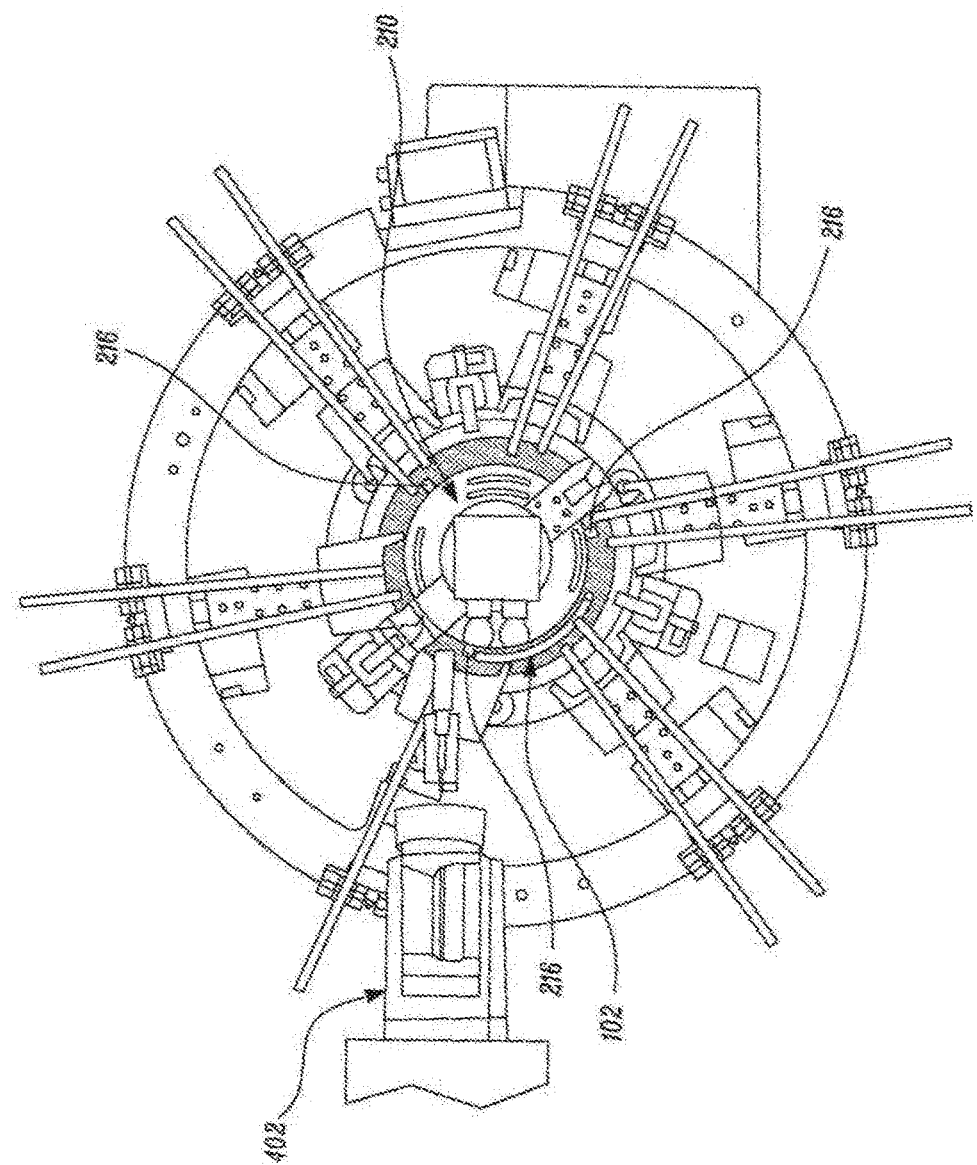
FIG. 5 illustrates a top view of the apparatus, according to certain embodiments of the present disclosure.

FIG. 4 illustrates further structural details of the apparatus 100 according to certain embodiments of the present disclosure. The apparatus 100 includes an end effector 402 adapted to grip and move the wire lead 102. The end effector 402 aids in moving the wire lead 102 from one position to another position. The end effector 402 includes a coupling mechanism 404 to hold the wire lead 102 while the end effector 402 moves the wire lead 102 from one position to another position. The coupling mechanism 404 includes two coupling members 406 to hold the wire lead 102. The coupling members 406 include semi-circular groves together defining a circular slot 407 having a diameter slightly greater than the diameter of the wire lead 102. The end effector 402 couples the wire lead 102 such that the wire lead 102 passes through the slot 407 and can be moved by the end effector 402 to a desired position. FIG. 5 shows a top view of the apparatus 100 showing the wire lead 102, after the arbor 210 has rotated the wire lead 102 along the circumference of the stator 106. The fulcrum pins 216 provide a fulcrum point to the wire lead 102 such that the wire lead 102 bends at the fulcrum pin 216 and subsequently rotate along the circumference of the stator 106.

With combined reference of FIGS. 4 and 5, the apparatus 100 further includes a controller 408 in communication with the arbor 210 and the end effector 402. The controller 408 may be any type of a data processing unit known to a person of ordinary skill in the art of electronic system design. The controller 408 may either be a single controller which controls movements of the arbor 210 and the end effector 402 or a group of multiple controllers which may separately control movements of the arbor 210 and the end effector 402. The controller 408 may be a computer program product, a microprocessor, or any other type of a controller which may suit the need of the present disclosure. The controller 408 may be coupled to a first driving mechanism and a second driving mechanism to control the movements of the arbor 210 and the end effector 402 respectively. The first driving mechanism and the second driving mechanism may be any type of driving mechanisms such as a servo-mechanism unit etc. for controlling the position of the end effector 402 and the arbor 210 as known to a person of ordinary skill in the art of automated machinery.

Figure 6:
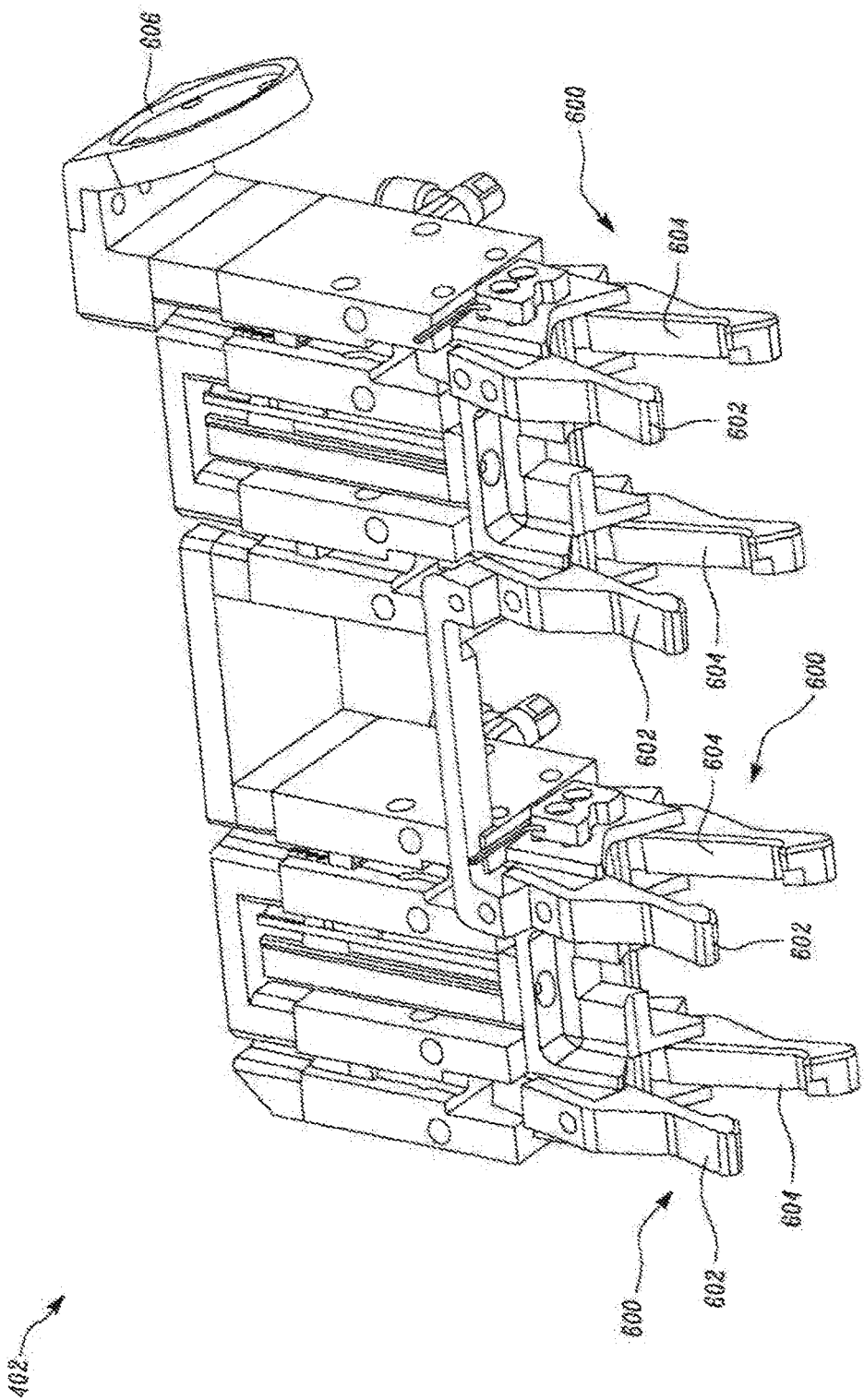
FIG. 6 illustrates structural details of the end effector, according to certain embodiments of the present disclosure.

FIG. 6 illustrates structural details of another design of the end effector 402 according to a specific embodiment of the present disclosure. The end effector 402 includes multiple couplers 600 which may be actuated through the controller 408 to hold the wire leads 102. According to a specific embodiment of the present disclosure, the end effector 402 includes four couplers 600. The couplers 600 include a first finger 602 and a second finger 604. To hold the wire lead 102, the coupler 600 may move the first and second fingers 602, 604 towards each other such that the wire lead 102 is held between the first finger 602 and the second finger 604. Further, the first and second fingers 602, 604 may be moved away from each other to release the wire lead 102. The end effector 402 further includes a support plate 606 to couple the end effector 402 to the support 212. The support plate 606 may be coupled to the support 212 through any suitable mechanical joining means such as fasteners etc.

Figure 7:
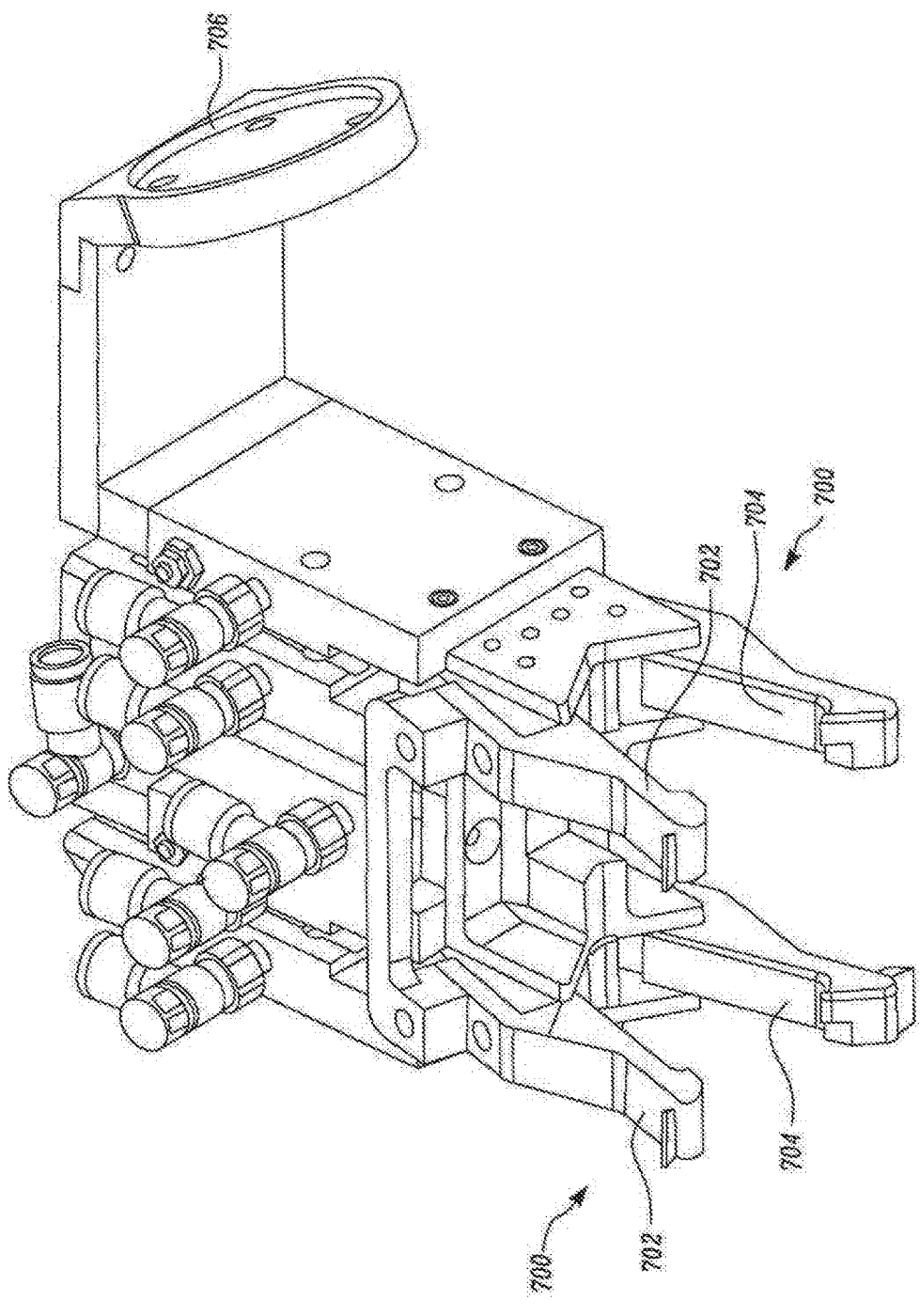
FIG. 7 illustrates structural details of the end effector, according to certain embodiments of the present disclosure.

FIG. 7 illustrates structural details of yet another design of the end effector 402 according to a specific embodiment of the present disclosure. The end effector 402 includes a pair of couplers 700. The pair of couplers includes a first coupling member 702 and a second coupling member 704. The first and second coupling members. To hold the wire lead 102, the pair of couplers 700 may move the first and second coupling members 702, 704 towards each other such that the wire lead 102 is held between the first coupling member 702 and the second coupling member 704. Further, the first and second coupling members 702, 704 may be moved away from each other to release the wire lead 102. The end effector 402 further includes a support plate 706 to couple the end effector 402 to the support 212. The support plate 706 may be coupled to the support 212 through any suitable mechanical joining means such as fasteners etc.

Referring to FIGS. 1-7, when the stator 106 is placed on the base assembly 104, the wire lead 102 is temporarily held in a vertical position by the multiple discs 108 provided with slots to hold the wire lead 102. According to another embodiment of the present disclosure, the end effector 402 is adapted to grip the wire lead 102 held in the vertical position and to move it to the first position in which the wire lead 102 is held by the clamp assembly 202. According to another embodiment of the present disclosure, a sensor (not shown) may be coupled to the base assembly 104 to sense whether the clamp assembly 202 is holding the wire lead 102. This information may be useful to control the motion of the end effector 402 by the controller 408. For example, prior to the rotation of the wire lead 102 by the arbor 210, if the controller 408 receives a sensor signal indicating that the wire lead 102 is not held in the clamp assembly 202, the controller 408 may provide a notification to an operator to manually check and subsequently adjust the positioning of the wire lead 102 as required.

Figure 8:
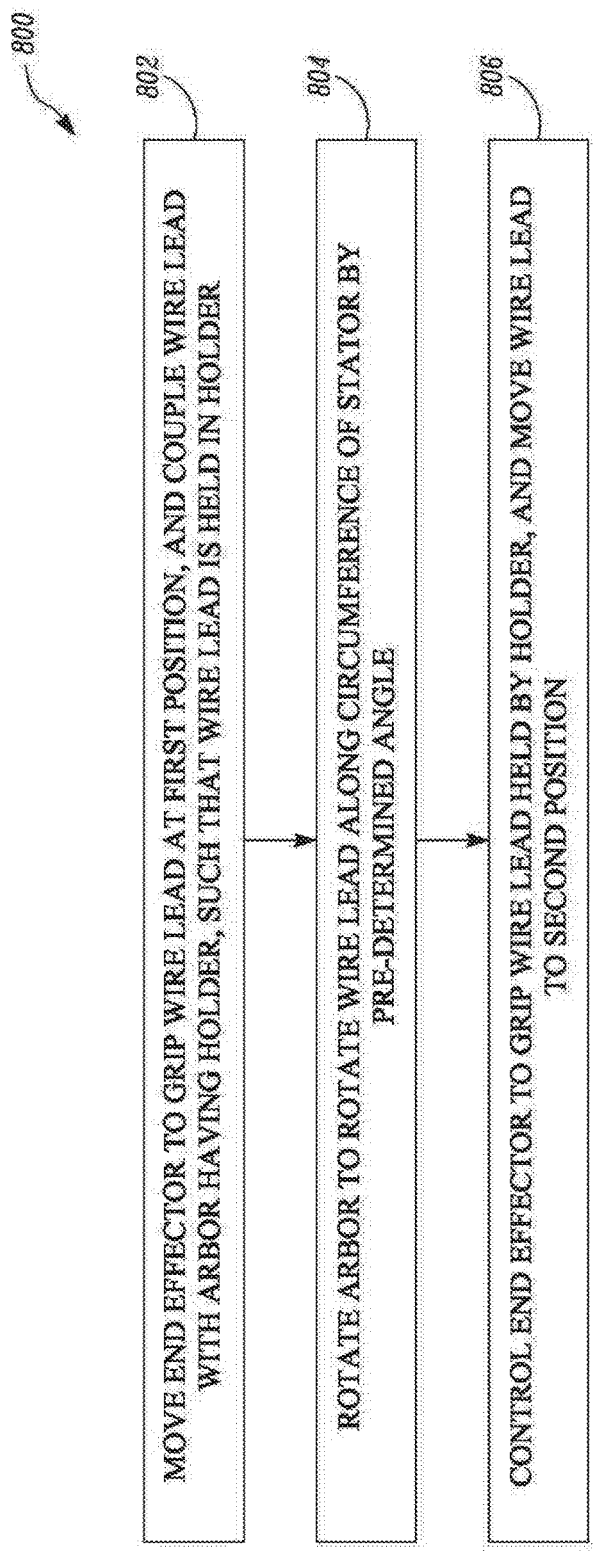
FIG. 8 illustrates a method of automatically routing the wire lead of the stator, according to certain embodiments of the present disclosure.

The controller 408 controls the various components of the apparatus 100 to perform the automatic routing of the wire lead 102 on the stator 106. The present disclosure provides with a method 800 to automatically route the wire lead 102 as shown in FIG. 8. The method 800 at step 802 moves the end effector 402 to grip the wire lead 102 at the first position. The controller 408 controls the movement of the end effector 402. The movement of the end effector 402 is controlled by the controller 408 to grip the wire lead 102, and subsequently couple the wire lead 102 with the arbor 210. Specifically, the wire lead 102 is held in the holder 214 of the arbor 210.

The method 800 at step 804 rotates the arbor 210 by a predetermined angle. The controller 408 rotates the arbor 210 by the pre-determined angle, thus rotating the wire lead 102 along the circumference of the stator 106. As shown, the arbor 210 includes the fulcrum pin 216 which bends the wire lead 102 along the circumference of the stator 106, when the arbor 210 is rotated. Once the desired rotation is achieved, the method 800 at step 806 moves the end effector 402 to grip the wire lead 102 held in the holder 214. The controller 408 controls the movement of the end effector 402 to move the wire lead 102 to the second position. The second position is at an angular offset with the first position thus achieving a desired angle between the lead end and the exit end of the wire lead 102. In a similar manner, the apparatus 100 is configured to manipulate multiple wire leads 102 and achieve desired angular relationship between them through the controller 408.

The present disclosure, through the apparatus 100 and the method 800 as explained above, provides an improved way of automatically routing the wire leads 102 on the stator 106 from the first position to the second position. The controller 408 governs the movements of various parts and needs no manual interventions in between to support the functioning of the apparatus 100. As the present disclosure is automated and takes substantially less time than the conventional methods of routing the wire lead 102 on the stator 106, the present disclosure clears a major hurdle in large scale production of the stator 106. Further, the apparatus 100 may include means to assemble a rotor and other parts of the electric motor (not shown) in the stator 106 as well so as to complete the assembly of the electric motor.

It may be possible that different sizes of electric motors and corresponding stators may be required for different applications. The present disclosure may provide means to accommodate routing of various sizes and models of the stator 106 by varying the programming of the controller 408 to suit the dimension of the new models of the stator 106, and may substantially save capital cost of installing separate set of tooling for each part. Further, as the present disclosure is automated and takes substantially less time than the conventional methods of routing the wire lead 102 on the stator 106.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to certain embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the automatic stator wire lead router. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including," "comprising," "incorporating," "consisting of," "have," and "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary," "secondary," "main," or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. An apparatus for automatically routing a wire lead of a stator from a first position to a second position, the stator having at least one wire lead wound around the stator, the apparatus comprising:
   a base assembly adapted to receive the stator;
   at least one clamp assembly mounted on the base assembly, the clamp assembly adapted to hold the wire lead at the first position;
   an arbor adapted to rotate the wire lead along a circumference of the stator, the arbor adapted to hold the wire lead through a holder;
   an end effector adapted to grip and move the wire lead; and
   a controller communicably coupled to the arbor and the end effector, wherein the controller is configured to:
   control a movement of the end effector to grip the wire lead at the first position, and to couple the wire lead with the arbor such that the wire lead is held in the holder;
   control a rotation of the arbor to rotate the wire lead along the circumference of the stator by a pre-determined angle; and
   control the end effector to grip the wire lead at the holder, and to move the wire lead to the second position.

2. The apparatus of claim 1, wherein the base assembly further includes a stator base plate adapted to receive the stator.

3. The apparatus of claim 2, wherein the stator base plate is adapted to rotate relative to the base assembly.

4. The apparatus of claim 1, wherein the pre-determined angle is 30 degrees.

5. The apparatus of claim 1 further comprising:
   at least one guide finger mounted on the base assembly, the guide finger adapted to support the wire lead between the stator and the clamp assembly.

6. The apparatus of claim 1 further comprising:
   a clamp ring mounted on the base assembly, the clamp ring disposed along a circumference of the base assembly in a vertically spaced apart manner.

7. The apparatus of claim 6, wherein the clamp assembly is mounted on the clamp ring.

8. The apparatus of claim 1 further comprising another clamp assembly to hold the wire lead at the second position.

9. The apparatus of claim 1, wherein the arbor further includes a fulcrum pin adapted to bend the wire lead along the circumference of the stator.

10. The apparatus of claim 1, wherein the second position is at an angular offset with the first position.

11. The apparatus of claim 1, wherein the arbor is adapted to rotate in a clockwise direction and an anti-clockwise direction.

12. A method of automatically routing a wire lead of a stator from a first position to a second position, the stator having at least one wire lead wound around the stator, the method comprising:
   moving an end effector to grip the wire lead at the first position, and to couple the wire lead with an arbor having a holder, such that the wire lead is held in the holder;
   rotating the arbor to rotate the wire lead along a circumference of the stator by a pre-determined angle; and
   controlling the end effector to grip the wire lead held by the holder, and to move the wire lead to the second position.

13. The method of claim 12, wherein the pre-determined angle is 30 degrees.

14. The method of claim 12, wherein the arbor further includes a fulcrum pin adapted to bend the wire lead along the circumference of the stator.

15. The method of claim 12, wherein the second position is at an angular offset with the first position.

16. The method of claim 12, wherein rotating the arbor comprises rotating the arbor in a clockwise direction and an anti-clockwise direction.

* * * * *